United States Patent Office 3,766,218
Patented Oct. 16, 1973

3,766,218
NOVEL SUBSTITUTED CHRYSANTHEMATES
Kenzo Ueda, Nishinomiya, Toshio Mizutani, Hirakata, Nobushige Itaya, Minoo, and Yositosi Okuno, Toyonaka, Japan, assignors to Sumitomo Chemical Company, Limited, Osaka, Japan
No Drawing. Filed Feb. 23, 1971, Ser. No. 118,194
Claims priority, application Japan, Feb. 26, 1970, 45/16,805; Mar. 2, 1970, 45/18,115; Dec. 17, 1970, 45/114,364
Int. Cl. C07c 69/00
U.S. Cl. 260—347.4                6 Claims

ABSTRACT OF THE DISCLOSURE

A compound of the formula,

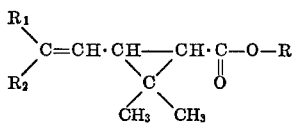

wherein $R_1$ is a methyl, $R_2$ is a $C_1$–$C_5$ alkoxymethyl, a $C_3$–$C_5$ alkenoxymethyl, a $C_3$–$C_5$ alkynoxymethyl, a $C_1$–$C_5$ alkylcarboxyl, a $C_2$–$C_5$ alkenylcarbonyl or a $C_2$–$C_5$ alkynylcarbonyl, or $R_1$ and $R_2$ are bonded at respective ends to form cyclic ketone, R is a member of

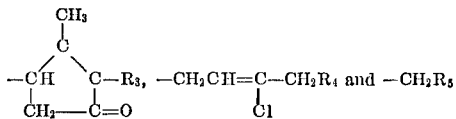

wherein $R_3$ is a $C_3$–$C_5$ alkenyl, a $C_3$–$C_5$ alkynyl or $C_5$ alkadienyl, $R_4$ is a substituted or unsubstituted phenyl, thienyl or furyl (the substituent being methyl, methoxy or a halogen), and $R_5$ is a substituted phenyl, thienyl or furyl (the substituent being a $C_1$–$C_3$ alkyl, a $C_3$–$C_5$ alkenyl, $C_5$ alkadienyl, a $C_3$–$C_5$ alkynyl, a halogen, benzyl, thenyl, furylmethyl, phenoxy, phenylthio or a polymethylene containing or not containing oxygen in the carbon chain having 3–4 carbon atoms), or phthalimido, thiophthalimido, di- or tetrahydrophthalimido or a substituted maleimido (the substituent being one or two $C_1$–$C_4$ alkyls or phenyls), which is useful as an active ingredient of insecticides.

---

This invention relates to novel substituted chrysanthemates, a process for preparing the same, and insecticidal compositions containing the same.

More particularly, the invention pertains to novel compounds represented by the Formula I,

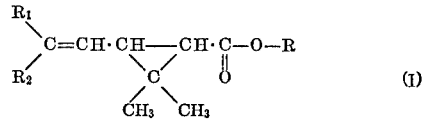

wherein $R_1$ is methyl, $R_2$ is a $C_1$–$C_5$ alkoxymethyl, a $C_3$–$C_5$ alkenoxymethyl, a $C_3$–$C_5$ alkynoxymethyl, a $C_1$–$C_5$ alkylcarboxyl, a $C_2$–$C_5$ alkenylcarbonyl or a $C_2$–$C_5$ alkynylcarbonyl, or $R_1$ and $R_2$ are bonded at respective ends to form cyclic ketone, R is a member of

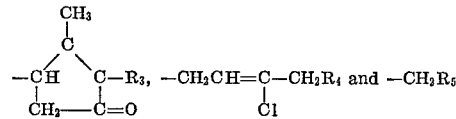

wherein $R_3$ is a $C_3$–$C_5$ alkenyl, a $C_3$–$C_5$ alkynyl or $C_5$ alkadienyl, $R_4$ is a substituted or unsubstituted phenyl, thienyl or furyl (the substituent being methyl, methoxy or a halogen), and $R_5$ is a substituted phenyl, thienyl or furyl (the substituent being a $C_1$–$C_3$ alkyl, a $C_3$–$C_5$ alkenyl, $C_5$ alkadienyl, a $C_3$–$C_5$ alkynyl, a halogen, benzyl, thenyl, furylmethyl, phenoxy, phenylthio or a polymethylene containing or not containing oxygen in the carbon chain having 3–4 carbon atoms), or phthalimido, thiophthalimido, di- or tetrahydrophthalimido or a substituted maleimido (the substituent being one or two $C_1$–$C_4$ alkyls or phenyls), a process for preparing the same; and insecticidal compositions containing the same as active ingredients.

The process of the present invention is characterized by reacting a compound represented by the Formula II,

$$R \cdot A \qquad (II)$$

wherein R is as defined above, and A is hydroxy or tosyloxy group or a halogen atom, with a cyclopropanecarboxylic acid, or a reactive derivative thereof, represented by the Formula III,

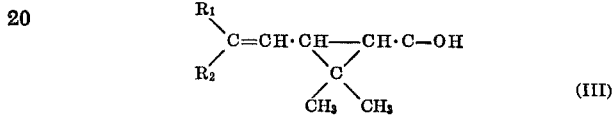

wherein $R_1$ and $R_2$ are as defined above.

Various insecticides of the cyclopropanecarboxylic acid ester type have heretofore been known, and several of such esters are present also in pyrethrum components. Among many insecticides used at present, these pyrethrum components have widely been used for the control of sanitary injurious insects and agricultural and horticultural injurious insects because of their such excellent insecticidal properties that they are not only high in insecticidal activity but also low in toxicity to mammals. On the other hand, however, they are expensive and are not particularly excellent in persistent effect. Accordingly, many attempts have been made by a large number of researchers to synthesize various homologous compounds. However, most of the attempts have been directed to the synthesis of alcohol components of the esters, and there are very few attempts which have been successful to synthesize acid components which are comparable in effectiveness to such natural products as chrysanthemic and pyrethric acids.

Characteristics of the most cyclopropanecarboxylic acid ester type insecticides reside in that they have quick knock down effects in addition to strong killing effects. Among these, pyrethric acid esters are relatively high in knock down effect. However, they have not practically been used on commercial scale because of difficult synthesis thereof, and therefore pyrethrum extracts have been used.

An object of the present invention is to provide the compound represented by the aforesaid Formula I which have excellent killing and knock down effects.

Another object of the invention is to provide a process for preparing the said compound.

A further object of the invention is to provide insecticidal compositions containing the said esters as active ingredients which are far more excellent in insecticidal effect than those containing conventional cyclopropanecarboxylic acid esters.

The present inventors synthesized various cyclopropanecarboxylic acid esters, and investigated the biological activities thereof to find that the present novel esters represented by the aforesaid Formula I not only show prominent insect-killing effects but also are more excellent in knock down effect than the other chrysanthemates.

Typical examples thereof are as set forth below, but it is needless to say that the present compounds are not limited to these. Among the esters represented by the Formula I, there are stereoisomers derived from the steric structures of carbon atoms and optical isomers, and these esters also are, of course, involved in the present invention.

| Compound number | Structural formula |
|---|---|
| 1 | 5-benzyl-3-furylmethyl 2′,2′-dimethyl-3′-(2″-methoxymethyl-1′-propenyl)-cyclopropanecarboxylate |
| 2 | 5-(2′-thenyl)-3-furylmethyl 2″,2″-dimethyl-3″-(2‴-methoxymethyl-1‴-propenyl)-cyclopropanecarboxylate |
| 3 | 5-benzyl-2-thenyl 2′,2′-dimethyl-3′-(2″-methoxymethyl-1″-propenyl)-cyclopropanecarboxylate |
| 4 | 3-benzylbenzyl 2′,2′-dimethyl-3′-(2″-methoxymethyl-1″-propenyl)-cyclopropanecarboxylate |
| 5 | 5-propargylfurfuryl 2′,2′-dimethyl 3′-(2″-methoxymethyl-1″-propenyl)-cyclopropanecarboxylate |
| 6 | 5-propargyl-2-thenyl 2′,2′-dimethyl-3′-(2″-methoxymethyl-1″-propenyl)-cyclopropanecarboxylate |
| 7 | 5-allylfurfuryl 2′,2′-dimethyl-3′-(2″-methoxymethyl-1″-propenyl)-cyclopropanecarboxylate |
| 8 | 4,5-dimethyl-2-thenyl 2′,2′-dimethyl-3′-(2″-methoxymethyl-1‴-propenyl)-cyclopropanecarboxylate |
| 9 | 4,5-tetramethylenefurfuryl 2′-2′-dimethyl-3′-(2″-methoxymethyl-1‴-propenyl)-cyclopropanecarboxylate |

TABLE—Continued

| Compound number | Structural formula |
|---|---|

10.

$$CH_3OCH_2\diagdown C=CH\cdot CH—CH\cdot C-O-CH_2-\text{(furyl)}-O-\text{(cyclohexyl)}$$
with $CH_3$ on the left carbon and cyclopropane ring bearing $CH_3, CH_3$, and $C=O$.

5-phenoxyfurfuryl 2',2'-dimethyl-3'-(2''-methoxymethyl-1''-propenyl)-cyclopropanecarboxylate

11.

3-phenoxybenzyl 2',2'-dimethyl-3'-(2''-methoxymethyl-1''-propenyl)-cyclopropanecarboxylate

12.

3,4,5,6-tetrahydrophthalimidomethyl 2',2'-dimethyl-3'-(2''-methoxymethyl-1''-propenyl)-cyclopropanecarboxylate

13.

Phthalimidomethyl 2,2-dimethyl-3-(2'-methoxymethyl-1'-propenyl)-cyclopropanecarboxylate

14.

3,6-dihydrophthalimidomethyl 2',2'-dimethyl-3'-(2''-methoxymethyl-1''-propenyl)-cyclopropanecarboxylate

15.

Dimethylmaleimidomethyl 2,2-dimethyl-3-(2'-methoxymethyl-1'-propenyl)-cyclopropanecarboxylate

16.

Methylethylmaleimidomethyl 2,2-dimethyl-3-(2'-methoxymethyl-1'-propenyl)-cyclopropanecarboxylate

17.

Monothiophthalimidomethyl 2,2-dimethyl-3-(2'-methoxymethyl-1'-propenyl)-cyclopropanecarboxylate TABLE—Continued

| Compound number | Structural formula |
|---|---|
| 18 | Phenylmethylmaleimidomethyl 2,2-dimethyl-3-(2'-methoxymethyl-1'-propenyl)-cyclopropanecarboxylate |
| 19 | 5-benzyl-3-furylmethyl 2',2'-dimethyl-3'-(2''-ethoxymethyl-1''-propenyl)-cyclopropanecarboxylate |
| 20 | 5-benzyl-3-furylmethyl 2',2'-dimethyl-3'-(2''-isopropyloxymethyl-1''-propenyl)-cyclopropanecarboxylate |
| 21 | 5-benzyl-3-furylmethyl 2',2'-dimethyl-3'-(2''-propargyloxymethyl-1''-propenyl)-cyclopropanecarboxylate |
| 22 | 5-benzyl-3-furylmethyl 2',2'-dimethyl-3'-(2''-allyloxymethyl-1''-propenyl)-cyclopropanecarboxylate |
| 23 | 5-benzyl-3-furylmethyl 2',2'-dimethyl-3'-(2''-acetyl-1''-propenyl)-cyclopropanecarboxylate |
| 24 | 5-benzyl-2-thenyl 2',2'-dimethyl-3'-(2''-acetyl-1''-propenyl)-cyclopropanecarboxylate |
| 25 | 5-propargylfurfuryl 2',2'-dimethyl-3'-(2''-acetyl-1''-propenyl)-cyclopropanecarboxylate |
| 26 | 5-oxa-4,5,6,7-tetrahydrobenzofurfuryl 2',2'-dimethyl-3'-(2''-acetyl-1''-propenyl)-cyclopropanecarboxylate |

TABLE—Continued

| Compound number | Structural formula |
|---|---|
| 27 | 4,5-trimethylenethenyl 2′,2′-dimethyl-3′-(2″-acetyl-1″-propenyl)-cyclopropanecarboxylate |
| 28 | 5-phenoxyfurfuryl 2′,2′-dimethyl-3′-(2″-acetyl-1″-propenyl)-cyclopropanecarboxylate |
| 29 | 5-phenoxy-2-thenyl 2′,2′-dimethyl-3′-(2″-acetyl-1″-propenyl)-cyclopropanecarboxylate |
| 30 | 3-phenoxybenzyl 2′,2′-dimethyl-3′-(2″-acetyl-1″-propenyl)-cyclopropanecarboxylate |
| 31 | 3-phenylthiobenzyl 2′,2′-dimethyl-3′-(2″-acetyl-1″-propenyl)-cyclopropanecarboxylate |
| 32 | 2,4,6-trichlorobenzyl 2′,2′-dimethyl-3′-(2″-acetyl-1″-propenyl)-cyclopropanecarboxylate |
| 33 | 3,4,5,6-tetrahydrophthalimidomethyl 2′,2′-dimethyl-3′-(2″-acetyl-1″-propenyl)-cyclopropanecarboxylate |
| 34 | Dimethylmaleimidomethyl 2′,2′-dimethyl-3′-(2″-acetyl-1″-propenyl)-cyclopropanecarboxylate |

TABLE—Continued

| Compound number | Structural formula |
|---|---|
| 35 | 5-benzyl-3-furylmethyl 2',2'-dimethyl-3'-(2''-ethylcarbonyl-1''-propenyl)-cyclopropanecarboxylate |
| 36 | 5-benzyl-3-furylmethyl 2',2'-dimethyl-3'-(2''-isopropylcarbonyl-1''-propenyl)-cyclopropanecarboxylate |
| 37 | 5-benzyl-3-furylmethyl 2',2'-dimethyl-3'-(2''-ethynylcarbonyl-1''-propenyl)-cyclopropanecarboxylate |
| 38 | 5-benzyl-3-furylmethyl 2',2'-dimethyl-3'-(2''-vinylcarbonyl-1''-propenyl)-cyclopropanecarboxylate |
| 39 | 5-benzyl-3-furylmethyl 2',2'-dimethyl-3'-(2''-propargylcarbonyl-1''-propenyl)-cyclopropanecarboxylate |
| 40 | 5-benzyl-3-furylmethyl 2',2'-dimethyl-3'-(2''-allylcarbonyl-1''-propenyl)-cyclopropanecarboxylate |
| 41 | 5-benzyl-3-furylmethyl 2',2'-dimethyl-3'-(cyclopentanone-2''-ylidenemethyl)-cyclopropanecarboxylate |
| 42 | 5-benzyl-3-furylmethyl 2',2'-dimethyl-3'-(cyclohexanone-2''-ylidenemethyl)-cyclopropanecarboxylate |

TABLE—Continued

| Compound number | Structural formula |
|---|---|

43.........

$$CH_3OCH_2\text{-}C(CH_3)\text{=}CH\text{-}CH\text{-}CH\text{-}C(\text{=}O)\text{-}O\text{-}CH\text{-}C(\text{=}C(CH_3))\text{-}CH_2\text{-}CH\text{=}CH_2,\ C(CH_3)_2,\ CH_2\text{-}C\text{=}O$$

2-allyl-3-methylcyclopent-2-ene-1-one-4-yl 2′,2′-dimethyl-3′-(2″-methoxymethyl-1″-propenyl)-cyclopropanecarboxylate

44.........

2-propargyl-3-methylcyclopent-2-ene-1-one-4-yl 2′,2′-dimethyl-3′-(2″-methoxymethyl-1″-propenyl)-cyclopropanecarboxylate

45.........

2-(2′,4′-pentadienyl)-3-methylcyclopent-2-ene-1-one-4-yl 2″,2″-dimethyl-3″-(2‴-methoxymethyl-1‴-propenyl)-cyclopropanecarboxylate

46.........

2-allyl-3-methylcyclopent-2-ene-1-one-4-yl 2′,2′-dimethyl-3′-(2″-ethoxymethyl-1″-propenyl)-cyclopropanecarboxylate

47.........

2-allyl-3-methylcyclopent-2-ene-1-one-4-yl 2′,2′-dimethyl-3′-(2″-isopropyloxymethyl-1″-propenyl)-cyclopropanecarboxylate

48.........

2-allyl-3-methylcyclopent-2-ene-1-one-4-yl 2′,2′-dimethyl-3′-(2″-propargyloxymethyl-1″-propenyl)-cyclopropanecarboxylate

49.........

2-allyl-3-methylcyclopent-2-ene-1-one-4-yl 2′,2′-dimethyl-3′-(2″-allyloxymethyl-1″-propenyl)-cyclopropanecarboxylate

50.........

2-allyl-3-methylcyclopent-2-ene-1-one-4-yl 2′,2′-dimethyl-3′-(2″-acetyl-1″-propenyl)-cyclopropanecarboxylate TABLE—Continued

| Compound number | Structural formula |
|---|---|
| 51 | 2-propargyl-3-methylcyclopent-2-ene-1-one-4-yl 2',2'-dimethyl-3'-(2''-acetyl-1''-propenyl)-cyclopropanecarboxylate |
| 52 | 2-(2'-butenyl)-3-methylcyclopent-2-ene-1-one-4-yl 2'',2''-dimethyl-3''-(2'''-acetyl-1'''-propenyl)-cyclopropanecarboxylate |
| 53 | 2-allyl-3-methylcyclopent-2-ene-1-one-4-yl 2',2'-dimethyl-3'-(2''-ethylcarbonyl-1''-propenyl)-cyclopropanecarboxylate |
| 54 | 2-allyl-3-methylcyclopent-2-ene-1-one-4-yl 2',2'-dimethyl-3'-(2''-isopropylcarbonyl-1''-propenyl)-cyclopropanecarboxylate |
| 55 | 2-allyl-3-methylcyclopent-2-ene-1-one-4-yl 2',2'-dimethyl-3'-(2''-ethynylcarbonyl-1''-propenyl)-cyclopropanecarboxylate |
| 56 | 2-allyl-3-methylcyclopent-2-ene-1-one-4-yl 2',2'-dimethyl-3'-(2''-vinylcarbonyl-1''-propenyl)-cyclopropanecarboxylate |
| 57 | 2-allyl-3-methylcyclopent-2-ene-1-one-4-yl 2',2'-dimethyl-3'-(2''-propargylcarbonyl-1''-propenyl)-cyclopropanecarboxylate |
| 58 | 2-allyl-3-methylcyclopent-2-ene-1-one-4-yl 2',2'-dimethyl-3'-(2''-allylcarbonyl-1''-propenyl)-cyclopropanecarboxylate |

TABLE—Continued

| Compound number | Structural formula |
|---|---|
| 59 | 2-allyl-3-methylcyclopent-2-ene-1-one-4-yl 2',2'-dimethyl-3'-(cyclopentanone-2''-ylidenemethyl)-cyclopropanecarboxylate |
| 60 | 2-propargyl-3-methylcyclopent-2-ene-1-one-4-yl 2',2'-dimethyl-3'-(cyclopentanone-2''-ylidenemethyl)-cyclopropanecarboxylate |
| 61 | 2-allyl-3-methylcyclopent-2-ene-1-one-4-yl 2',2'-dimethyl-3'-(cyclohexanone-2''-ylidenemethyl)-cyclopropanecarboxylate |
| 62 | 3-chloro-4-phenyl-2-butene-1-yl 2',2'-dimethyl-3'-(2''-methoxymethyl-1''-propenyl)-cyclopropanecarboxylate |
| 63 | 3-chloro-4-(2'-thienyl)-2-butene-1-yl 2'',2''-dimethyl-3''-(2'''-methoxymethyl-1''''-propenyl)-cyclopropanecarboxylate |
| 64 | 3-chloro-4-(2'-furyl)-2-butene-1-yl 2'',2''-dimethyl-3''-(2'''-methoxymethyl-1''''-propenyl)-cyclopropanecarboxylate |
| 65 | 3-chloro-4-(p-methylphenyl)-2-butene-1-yl 2',2'-dimethyl-3'-(2''-methoxymethyl-1''-propenyl)-cyclopropanecarboxylate |
| 66 | 3-chloro-4-(m-methylphenyl)-2-butene-1-yl 2',2'-dimethyl-3'-(2''-methoxymethyl-1''-propenyl)-cyclopropanecarboxylate |
| 67 | 3-chloro-4-(o-methylphenyl)-2-butene-1-yl 2',2'-dimethyl-3'-(2''-methoxymethyl-1''-propenyl)-cyclopropanecarboxylate |

TABLE—Continued

| Compound number | Structural formula |
|---|---|

68 ..........

$$CH_3OCH_2\diagdown C=CH\cdot CH\underset{\underset{CH_3\ \ CH_3}{C}}{\overline{\hspace{1em}}}CH\cdot\underset{O}{C}-O-CH_2\cdot CH=\underset{Cl}{C}\cdot CH_2-\bigcirc-Cl$$
$$CH_3\diagup$$

3-chloro-4-(p-chlorophenyl)-2-butene-1-yl 2′,2′-dimethyl-3′-(2″-methoxymethyl-1″-propenyl)-cyclopropanecarboxylate

69 ..........

$$CH_3OCH_2\diagdown C=CH\cdot CH\underset{\underset{CH_3\ \ CH_3}{C}}{\overline{\hspace{1em}}}CH\cdot\underset{O}{C}-O-CH_2\cdot CH=\underset{Cl}{C}\cdot CH_2-\bigcirc^{Cl}$$
$$CH_3\diagup$$

3-chloro-4-(m-chlorophenyl)-2-butene-1-yl 2′,2′-dimethyl-3′-(2″-methoxymethyl-1″-propenyl)-cyclopropanecarboxylate

70 ..........

$$CH_3OCH_2\diagdown C=CH\cdot CH\underset{\underset{CH_3\ \ CH_3}{C}}{\overline{\hspace{1em}}}CH\cdot\underset{O}{C}-O-CH_2\cdot CH=\underset{Cl}{C}\cdot CH_2-\bigcirc-Br$$
$$CH_3\diagup$$

3-chloro-4-(p-bromophenyl)-2-butene-1-yl 2′,2′-dimethyl-3′-(2″-methoxymethyl-1″-propenyl)-cyclopropanecarboxylate

71 ..........

$$CH_3OCH_2\diagdown C=CH\cdot CH\underset{\underset{CH_3\ \ CH_3}{C}}{\overline{\hspace{1em}}}CH\cdot\underset{O}{C}-O-CH_2\cdot CH=\underset{Cl}{C}\cdot CH_2-\bigcirc-OCH_3$$
$$CH_3\diagup$$

3-chloro-4-(p-methoxyphenyl)-2-butene-1-yl 2′,2′-dimethyl-3′-(2″-methoxymethyl-1″-propenyl)-cyclopropanecarboxylate

72 ..........

$$CH_3OCH_2\diagdown C=CH\cdot CH\underset{\underset{CH_3\ \ CH_3}{C}}{\overline{\hspace{1em}}}CH\cdot\underset{O}{C}-O-CH_2\cdot CH=\underset{Cl}{C}\cdot CH_2-\underset{S}{\diagup\diagdown}-CH_3$$
$$CH_3\diagup$$

3-chloro-4-(5′-methyl-2′-thienyl)-2-butene-1-yl 2″,2″-dimethyl-3″-(2‴-methoxymethyl-1‴-propenyl)-cyclopropanecarboxylate

73 ..........

$$C_2H_5OCH_2\diagdown C=CH\cdot CH\underset{\underset{CH_3\ \ CH_3}{C}}{\overline{\hspace{1em}}}CH\cdot\underset{O}{C}-O-CH_2\cdot CH=\underset{Cl}{C}\cdot CH_2-\bigcirc$$
$$CH_3\diagup$$

3-chloro-4-phenyl-2-butene-1-yl 2′,2′-dimethyl-3′-(2″-ethoxymethyl-1″-propenyl)-cyclopropane-carboxylate

74 ..........

$$i\text{-}C_3H_7OCH_2\diagdown C=CH\cdot CH\underset{\underset{CH_3\ \ CH_3}{C}}{\overline{\hspace{1em}}}CH\cdot\underset{O}{C}-O-CH_2\cdot CH=\underset{Cl}{C}\cdot CH_2-\bigcirc$$
$$CH_3\diagup$$

3-chloro-4-phenyl-2-butene-1-yl 2′,2′-dimeth 1-3′-(2″-isopropyloxymethyl-1″-propenyl)-cyclopropanecarboxylate

75 ..........

$$HC\equiv C\cdot CH_2OCH_2\diagdown C=CH\cdot CH\underset{\underset{CH_3\ \ CH_3}{C}}{\overline{\hspace{1em}}}CH\cdot\underset{O}{C}-O-CH_2\cdot CH=\underset{Cl}{C}\cdot CH_2-\bigcirc$$
$$CH_3\diagup$$

3-chloro-4-phenyl-2-butene-1-yl 2′,2′-dimethyl-3′-(2″-propargyloxymethyl-1″-propenyl)-cyclopropanecarboxylate

76 ..........

$$H_2C=CH\cdot CH_2OCH_2\diagdown C=CH\cdot CH\underset{\underset{CH_3\ \ CH_3}{C}}{\overline{\hspace{1em}}}CH\cdot\underset{O}{C}-O-CH_2\cdot CH=\underset{Cl}{C}\cdot CH_2-\bigcirc$$
$$CH_3\diagup$$

3-chloro-4-phenyl-2-butene-1-yl 2′,2′-dimethyl-3′-(2″-allyloxymethyl-1″-propenyl)-cyclopropanecarboxylate TABLE—Continued

| Compound number | Structural formula |
|---|---|
| 77 | [structure] 3-chloro-4-phenyl-2-butene-1-yl 2',2'-dimethyl-3'-(2''-acetyl-1''-propenyl)-cyclopropanecarboxylate |
| 78 | [structure] 3-chloro-4-(2'-thienyl)-2-butene-1-yl 2'',2''-dimethyl-3''-(2'''-acetyl-1''''-propenyl)-cyclopropanecarboxylate |
| 79 | [structure] 3-chloro-4-phenyl-2-butene-1-yl 2',2'-dimethyl-3'-(2''-ethylcarbonyl-1''-propenyl)-cyclopropanecarboxylate |
| 80 | [structure] 3-chloro-4-phenyl-2-butene-1-yl 2',2'-dimethyl-3'-(2''-isopropylcarbonyl-1''-propenyl)-cyclopropanecarboxylate |
| 81 | [structure] 3-chloro-4-phenyl-2-butene-1-yl 2',2'-dimethyl-3'-(2''-ethynylcarbonyl-1''-propenyl)-cyclopropanecarboxylate |
| 82 | [structure] 3-chloro-4-phenyl-2-butene-1-yl 2',2'-dimethyl-3'-(2''-vinylcarbonyl-1''-propenyl)-cyclopropanecarboxylate |
| 83 | [structure] 3-chloro-4-phenyl-2-butene-1-yl 2',2'-dimethyl-3'-(2''-propargylcarbonyl-1''-propenyl)-cyclopropanecarboxylate |
| 84 | [structure] 3-chloro-4-phenyl-2-butene-1-yl 2',2'-dimethyl-3'-(2''-allylcarbonyl-1''-propenyl)-cyclopropanecarboxylate |
| 85 | [structure] 3-chloro-4-phenyl-2-butene-1-yl 2',2'-dimethyl-3'-(cyclopentanone-2''-ylidenemethyl)-cyclopropanecarboxylate |

TABLE—Continued

| Compound number | Structural formula |
|---|---|
| 86 | 3-chloro-4-phenyl-2-butene-1-yl 2',2'-dimethyl-3'-(cyclohexanone-2''-ylidenemethyl)-cyclopropanecarboxylate |

The compounds of the Formula I, which are exemplified as above are low toxic and have excellent insecticidal effects. Particularly when these esters of the present invention are compared in knock down effect on various injurious insects with chrysanthemic acid esters which are different in acid portion therefrom, the present esters are more excellent than the corresponding chrysanthemic acid esters. In order to further clarify the above fact, comparisons in biological activity are set forth below with reference to experimental examples. In the case of other compounds represented by the Formula I, the same tendency in biological activity as above was observed as well. Further, this tendency is observed also in the case of geometrical isomers and optical isomers.

EXPERIMENTAL EXAMPLE 1

The present compounds (1), (2), (3), (5), (6), (7), (9), (10), (11), (12), (15), (17), (23), (43), (44), (45), (48), (50), (60), (62), (63), (64), (65), (76), (77), and (81) and chrysanthemic acid esters corresponding thereto were individually adjusted to test concentrations by use of deodorized kerosene. On the other hand, about 20 adults of house flies were liberated in a (70 cm.³) glass chamber. Into the chamber, 0.7 ml. of each of the resulting oil sprays was sprayed under a pressure of 20 lb./in.² by use of a glass atomizer, and the number of knocked-down flies was counted with lapse of time. After 10 minutes, the knocked-down flies were collected and fed, and the alive and dead thereof were observed on the next day to calculate $KT_{50}$ (50% knock down time) and mortality. The results obtained are as set forth in the following table:

| Test compound | Oil spray (percent) | $KT_{50}$ (sec.) | Knock down mortality (percent) |
|---|---|---|---|
| Present compound (1) | 0.1 | 145 | 96 |
| Do | 0.2 | 106 | 100 |
| Present compound (23) | 0.1 | 122 | 80 |
| Chrysanthemic acid ester corresponding to (1) or (23) | 0.1 | 395 | 89 |
|  | 0.5 | 159 | 100 |
| Present compound (2) | 0.1 | 205 | 82 |
| Chrysanthemic acid ester corresponding to (2) | 0.1 | 435 | 68 |
| Present compound (3) | 0.2 | 212 | 90 |
| Chrysanthemic acid ester corresponding to (3) | 0.2 | 440 | 69 |
| Present compound (5) | 0.1 | 126 | 85 |
| Chrysanthemic acid ester corresponding to (5) | 0.1 | 210 | 77 |
| Present compound (6) | 0.2 | 155 | 94 |
| Chrysanthemic acid ester corresponding to (6) | 0.2 | 306 | 90 |
| Present compound (7) | 0.2 | 142 | 95 |
| Chrysanthemic acid ester corresponding to (7) | 0.2 | 293 | 92 |
| Present compound (9) | 0.2 | 216 | 98 |
| Chrysanthemic acid ester corresponding to (9) | 0.2 | 325 | 86 |
| Present compound (10) | 0.2 | 135 | 100 |
| Chrysanthemic acid ester corresponding to (10) | 0.2 | 270 | 92 |
| Present compound (11) | 0.3 | 207 | 100 |
| Chrysanthemic acid ester corresponding to (11) | 0.3 | 465 | 81 |
| Present compound (12) | 0.1 | 130 | 42 |
| Chrysanthemic acid ester corresponding to (12) | 0.1 | 142 | 40 |
| Present compound (15) | 0.1 | 102 | 49 |
| Chrysanthemic acid ester corresponding to (15) | 0.1 | 147 | 44 |
| Present compound (17) | 0.1 | 132 | 57 |
| Chrysanthemic acid ester corresponding to (17) | 0.1 | 179 | 56 |
| Present compound (43) | 0.2 | 102 | 75 |
| Present compound (48) | 0.2 | 141 | 79 |
| Present compound (50) | 0.2 | 115 | 70 |
| Chrysanthemic acid ester corresponding to (3), (48) or (50) | 0.2 | 185 | 67 |
| Present compound (44) | 0.2 | 98 | 81 |
| Present compound (60) | 0.2 | 135 | 86 |
| Chrysanthemic acid ester corresponding to (44) or (60) | 0.2 | 162 | 75 |
| Present compound (45) | 0.1 | 112 | 52 |
| Chrysanthemic acid ester corresponding to (45) | 0.1 | 145 | 47 |
| Present compound (62) | 0.1 | 352 | 64 |
| Present compound (62) | 0.2 | 215 | 90 |
| Present compound (76) | 0.2 | 276 | 86 |
| Present compound (77) | 0.1 | 335 | 60 |
| Present compound (77) | 0.2 | 210 | 78 |
| Present compound (81) | 0.2 | 314 | 84 |
| Chrysanthemic acid ester corresponding to (62), (76), (77) or (81) | 0.2 | >600 | — |
| Do | 0.5 | 410 | 84 |
| Present compound (63) | 0.1 | 405 | 52 |
| Present compound (63) | 0.2 | 290 | 75 |
| Chrysanthemic acid ester corresponding to (63) | 0.5 | 486 | 77 |
| Present compound (64) | 0.1 | 376 | 54 |
| Present compound (64) | 0.2 | 254 | 76 |
| Chrysanthemic acid ester corresponding to (64) | 0.5 | 462 | 73 |
| Present compound (65) | 0.1 | 432 | 50 |
| Present compound (65) | 0.2 | 298 | 71 |
| Chrysanthemic acid ester corresponding to (65) | 0.5 | 500 | 60 |

EXPERIMENTAL EXAMPLE 2

The present compounds (62) and (77), which had displayed excellent knock down effects in Experimental Example 1, and pyrethric acids corresponding thereto, were individually adjusted to test concentrations by use of deodorized kerosene. In the same manner as in Experimental Example 1, the resulting oil sprays were tested in effectiveness on housefly adults and Northern house mosquito adults. The results obtained are as set forth in the following table:

| | | House fly adults | | Northern house mosquito adults | |
|---|---|---|---|---|---|
| Test compound | Oil spray (percent) | $KT_{50}$ (sec.) | Knock down mortality (percent) | $KT_{50}$ (sec.) | Knock down mortality (percent) |
| Present compound (62) | 0.2 | 215 | 90 | 159 | 98 |
| Present compound (77) | 0.2 | 210 | 78 | 150 | 90 |
| Pyrethric acid ester corresponding to (62) or (77) | 0.5 | 314 | 64 | 268 | 75 |

As is clear from the insectional effects shown in the above-mentioned experimental examples, all the present esters are more excellent in knock down effect then the corresponding chrysanthemic acid esters and are far more marked in effectiveness.

For example, a crysanthemic acid ester corresponding to the present compound (1) is called "Chrysron" (registered trademark of Sumitomo Chemical Co., Ltd.) and is said to be highest in killing effect among the cyclopropanecarboxylic acid ester type insecticides which are actually used at present. However, Chrysron is far inferior in quick acting property, i.e. knock down effect, to phthalthrin (a chrysanthemic acid ester corresponding to the present compound (12)] which is also used at present in practice. On the other hand, the phthalthrin, which is most excellent in quick acting property, is inferior in killing effect to said Chrysron. Thus, the conventional insecticides individually have their merits and demerits.

However, a 0.1% oil spray of the present compound (1) is more excellent in knock down effect than a 0.5% oil spray of Chrysron, and is substantially identical in $KT_{50}$ value with a 0.1% oil spray of phthalthrin, and it has been found that the present compounds are ideal compounds which have the killing effect of Chrysron in combination with the quick acting property of phthalthrin. Thus, the present compounds have come to be put into practical use.

The present compounds have marked killing and knock down effects on house flies, as is clear also from the aforesaid experimental examples. Further, they show excellent killing effects on sanitary injurious insects such as mosquitoes, cockroaches and the like, and other insects injurious to stored cereals, and, nevertheless, are low toxic to mammals. Owing to such characteristics, the present esters find broad uses for the prevention of epidemics and for the control of insects injurious to stored cereals. Furthermore, they are extremely useful for the control of agricultural and forestry injurious insects such as green rice leafhoppers, smaller brown planthoppers, larvae of Japanese giant silk moth, common cabbage worms, cabbage armyworms, larvae of diamond back moth, common cutworms etc. Particularly, they are low toxic and harmless to mammals, and hence are freely applicable to crops before harvest, foods and packaging materials, and are usable for home horticulture and green house cultivation.

As mentioned previously, the esters represented by the Formula I are obtained by reacting a compound represented by the Formula II with a cyclopropanecarboxylic acid represented by the Formula III or a reactive derivative thereof, if necessary in the presence of a suitable reaction auxiliary agent. Procedures for the synthesis of the present esters are mentioned in further detail below.

PROCEDURE 1

The case where A in the Formula II represents hydroxyl group, i.e. a procedure for obtaining an ester of the Formula I by reacting a compound represented by the formula IV.

ROH     (IV)

wherein R is as defined previously, with a carboxylic acid of the Formula III or a halide or anhydride of said acid.

In case the acid itself is used, the reaction is accomplished under dehydration conditions. That is, an alcohol of the Formula IV is reacted with a carboxylic acid of the Formula III in an inert solvent such as benzene or petroleum ether in the presence of a dehydrating agent such as dicyclohexyl carbodiimide at room temperature or above, whereby an ester represented by the Formula I can be obtained.

In case an acid halide is used, the reaction can be sufficiently accomplished at room temperature by reacting the acid halide with an alcohol of the Formula IV, using as a dehydrogen halide agent such as organic tertiary base as pyridine or triethylamine. The acid halide used in this case may be any halide within the scope of the invention, but is ordinarily an acid chloride. In the reaction, a solvent may be used to effect the reaction smoothly, and such an inert solvent as benzene, toluene or petroleum benzene is ordinarily used.

In case an acid anhydride is used, no auxiliary agent is particularly required, and the object can be accomplished by reacting the acid anhydride at room temperature with an alcohol of the Formula IV. In this case, the elevation of temperature is preferable for acceleration of the reaction, and the use of an inert solvent is preferable for smooth reaction.

PROCEDURE 2

The case where A in the Formula II represents a halogen atom, i.e. a procedure for obtaining an ester represented by the Formula I by use of a compound represented by the Formula V.

RV     (V)

wherein R is as defined previously; and X is a halogen atom. In this case, the other reactant, i.e. a carboxylic acid represented by the Formula III, may be used in the form of a salt of an alkali metal or an organic tertiary base, or may be added at the time of reaction together with an organic tertiary base. According to this procedure, it is desirable for smooth reaction to use an inert solvent such as benzene, acetone and dimethylformamide and to heat the reaction system to or below the boiling point of said solvent. The X in the Formula V is ordinarily chlorine atom, but may be any of other halogen atoms.

PROCEDURE 3

The case where A in the Formula II represents a tosyloxy group, i.e. a procedure for obtaining an ester represented by the Formula I by use of a compound represented by the Formula VI.

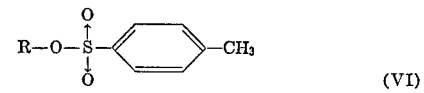
(VI)

wherein R is as defined previously. In this case, the other reactant and the reaction conditions are the same as in the case of the above-mentioned procedure 2.

The carboxylic acids of the Formula III, which are used in the present invention, are novel compounds and may be prepared easily by reduction and etherification or Grignard reaction and oxidation of the corresponding aldehyde according to the following reaction equation:

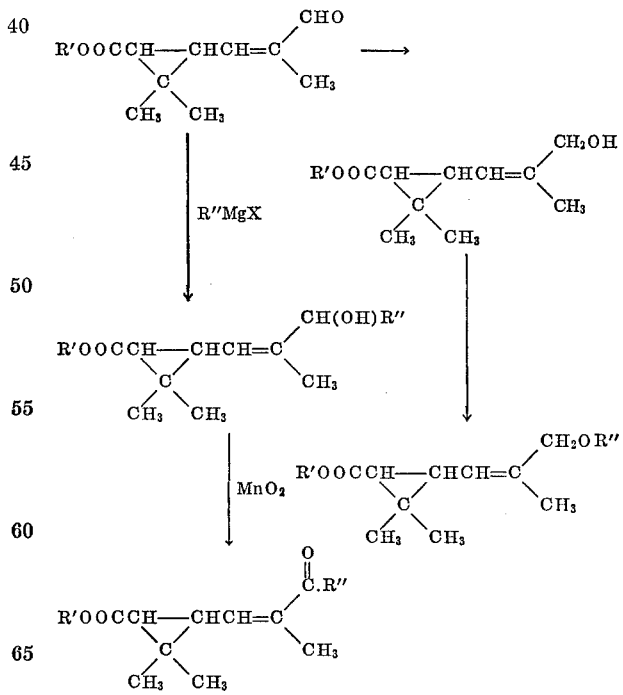

wherein R' is a lower alkyl and R" is an alkyl, an alkenyl or an alkynyl having up to 5 carbon atoms. Typical examples of said acids are as set forth below. Reactive derivatives of these carboxylic acids can be easily prepared according to known procedures, e.g. procedures adopted in the case of chrysanthemic acids.

2,2-dimethyl-3-(2'-methoxymethyl-1'-propenyl)-cyclopropanecarboxylic acid 2,2-dimethyl-3-(2'-ethoxymethyl-1'-propenyl)-cyclopropanecarboxylic acid
2,2-dimethyl-3-(2'-isopropyloxymethyl-1'-propenyl)-cyclopropanecarboxylic acid
2,2-dimethyl-3-(2'-propargyloxymethyl-1'-propenyl)-cyclopropanecarboxylic acid
2,2-dimethyl-3-(2'-allyloxymethyl-1'-propenyl)-cyclopropanecarboxylic acid
2,2-dimethyl-3-(2'-acetyl-1'-propenyl)-cyclopropanecarboxylic acid
2,2-dimethyl-3-(2'-ethylcarbonyl-1'-propenyl)-cyclopropanecarboxylic acid
2,2-dimethyl-3-(2'-isopropylcarbonyl-1'-propenyl)-cyclopropanecarboxylic acid
2,2-dimethyl-3-(2'-ethynylcarbonyl-1'-propenyl)-cyclopropanecarboxylic acid
2,2-dimethyl-3-(2'-vinylcarbonyl-1'-propenyl)-cyclopropanecarboxylic acid
2,2-dimethyl-3-(2'-propargylcarbonyl-1'-propenyl)-cyclopropanecarboxylic acid
2,2-dimethyl-3-(2'-allylcarbonyl-1'-propenyl)-cyclopropanecarboxylic acid
2,2-dimethyl-3-(cyclopentanone-2'-ylidenemethyl)-cyclopropanecarboxylic acid
2,2-dimethyl-3-(cyclohexanone-2'-ylidenemethyl)-cyclopropanecarboxylic acid.

The compound represented by the Formula IV are converted to the halides of the Formula V by halogenation with thionyl halides or phosphorus halides, and are converted to the tosylates of the Formula VI by reaction with p-toluenesulfonyl chloride. Typical examples of the alcohols represented by the Formula IV are as shown below.

5-benzyl-3-furylmethyl alcohol
5-(2'-thenyl)-3-furylmethyl alcohol
5-benzyl-2-thenyl alcohol
3-benzylbenzyl alcohol
4-propargylbenzyl alcohol
5-propargylfurfuryl alcohol
5-propargyl-2-thenyl alcohol
4-allylbenzyl alcohol
5-allylfurfuryl alcohol
4,5-dimethyl-2-thenyl alcohol
4,5-tetramethylenefurfuryl alcohol
4,5-trimethylene-2-thenyl alcohol
5-oxa-4,5,6,7-tetrahydrobenzofurfuryl alcohol
5-phenoxyfurfuryl alcohol
5-phenoxy-2-thenyl alcohol
3-phenoxybenzyl alcohol
3-phenylthiobenzyl alcohol
2,4,6-trimethylbenzyl alcohol
2,4,6-trichlorobenzyl alcohol
N-hydroxymethyl-3,4,5,6-tetrahydrophthalimide
N-hydroxymethyl-phthalimide
N-hydroxymethyl-thiophthalimide
N-hydroxymethyl-3,6-dihydrophthalimide
N-hydroxymethyl-dimethylmaleimide
N-hydroxymethyl-methylethylmaleimide
N-hydroxymethyl-phenylmethylmaleimide
2-allyl-3-methylcyclopent-2-ene-1-one-4-ol
2-propargyl-3-methylcyclopent-2-ene-1-one-4-ol
2-(2',4'-pentadienyl)-3-methylcyclopent-2-ene-1-one-4-yl
2-(2'-butenyl)-3-methylcyclopent-2-ene-1-one-4-yl
3-chloro-4-phenyl-2-butene-1-ol
3-chloro-4-(2'-thienyl)-2-butene-1-ol
3-chloro-4-(2'-furyl)-2-butene-1-ol
3-chloro-4-(p-methylphenyl)-2-butene-1-ol
3-chloro-4-(m-methylphenyl)-2-butene-1-ol
3-chloro-4-(o-methylphenyl)-2-butene-1-ol
3-chloro-4-(p-chlorophenyl)-2-butene-1-ol
3-chloro-4-(m-chlorophenyl)-2-butene-1-ol
3-chloro-4-(o-chlorophenyl)-2-butene-1-ol
3-chloro-4-(p-bromophenyl)-2-butene-1-ol
3-chloro-4-(p-methoxyphenyl)-2-butene-1-ol
3-chloro-4-(m-methoxyphenyl)-2-butene-1-ol
3-chloro-4-(5'-methyl-2'-thienyl)-2-butene-1-ol
3-chloro-4-(5'-methyl-2'-furyl)-2-butene-1-ol.

In preparing the insecticidal compositions of the present invention, the present compounds may be formulated into oil sprays, emulsifiable concentrates, dusts, aerosols, wettable powders, granules, mosquito coils and other heating or non-heating fumigants according to the procedures thoroughly known to those skilled in the art, using diluents for general insecticides, like in the case of the conventional pyrethroides. Alternatively, they may be formed into death-inducing powder or solid preparations incorporated with baits or other substances attractive for injurious insects.

Further, the combination of two or more present compounds may display more excellent insecticidal activities, and the present compounds or a mixture thereof can be enhanced in insecticidal effect when used in admixture with synergists for pyrethroides such as α-[2-(2-butoxyethoxy)ethoxy]-4,5-methylenedioxy-2-propyltoluene hereinafter referred to as "piperonyl butoxide"), 1,2-methylenedioxy-4-[2-(octylsulfinyl)propyl]benzene (hereinafter referred to as "sulfoxide") 4-(3,4-methylenedioxyphenyl)-5-methyl-1,3-dioxane (hereinafter referred to as "sufroxane") and N-(2-ethylhexyl)-bicyclo[2,2,1]hepta-5-ene-2,3-dicarboximide (hereinafter referred to as "MGK-264"), or other known synergists effective for allethrin and pyrethrin.

Further, when the present compounds are incorporated with suitable amounts of, as stabilizers, phenol derivatives such as BHT, bisphenol derivatives, or arylamines such as phenyl-α-naphthylamine, phenyl-β-naphthylamine and phenetidine-acetone condensates, it is possible to obtain insecticidal compositions which have been more stabilized in effect.

Still further, the present compounds may be used in admixture with other physiologically active materials, e.g. pyrethrin (pyrethrum extract), other cyclopropanecarboxylic acid ester type insecticides such as allethrin, N-(chrysanthemoxymethyl)-3,4,5,6-tetrahydrophthalimide (hereinafter referred to as "phthalthrin"), 5-benzyl-3-furylmethyl chrysanthemate (hereinafter referred to as "Chrysron," registered trademark of Sumitomo Chemical Co., Ltd.) and their geometrical and optical isomers, organo-chlorine type insecticides such as DDT, BHC and methoxychlor, organophosphorus type insecticides such as O,O-dimethyl-O-(3-methyl-4-nitrophenyl) phosphorothioate (hereinafter referred to as "Sumithion," registered trademark of Sumitomo Chemical Co., Ltd.) and O,O-dimethyl-O-(2,2-dichlorovinyl) phosphate (hereinafter referred to as as "DDVP"), carbamate type insecticides such as 1-naphthyl-N-methylcarbamate, 3,4-dimethylphenyl-N-methylcarbamate and 3,5-dimethylphenyl-N-methylcarbamate, or other agricultural chemicals such as fungicides, nematocides, acaricides, herbicides, etc., whereby multipurpose compositions excellent in effect can be prepared, and synergistic effects due to mixing therewith can be expected.

The process of the present invention is illustrated below with reference to examples.

In the first place, standard operational procedures for synthesis of the present compounds are explained.

(A) Procedure according to the reaction of the alcohol with the carboxylic acid halides: To a solution of 0.05 mole of the alcohol in 3 times the volume of said alcohol of dry benzene is added 0.075 mole of pyridine. To this solution is added a solution of 0.053 mole of carboxylic acid chloride in 3 times the volume of said chloride of dry benzene, whereby an exothermic reaction takes place. After allowing the reaction mixture to stand overnight in a closed vessel, a small amount of water is added to the mixture to dissolve deposited pyridine hydrochloride, and then the water layer is separated. The organic acid solution, a saturated aqueous sodium hydrogencarbonate solution and a saturated aqueous sodium chloride solution, and then dried over anhydrous sodium sulfate. Thereafter, the benzene is removed by distillation, and the residue is purified according to silica gel chromatography, distillation or recrystallization to obtain a desired ester.

(B) Procedure according to the dehydration reaction of the alcohol with the carboxylic acid: A solution of 0.05 mole of the alcohol in 3 times the volume of said alcohol of dry benzene is mixed with a solution of 0.05 mole of the carboxylic acid in 3 times the volume of said acid of benzene. The mixed solution is added with 0.08 mole of dicyclohexyl carbodiimide, and then allowed to stand overnight in a closed vessel. On the next day, the reaction mixture is heated under reflux for 2 hours to complete the reaction and then cooled, and the deposited dicyclohexylurea is separated by filtration. Thereafter, the same aftertreatment as in the standard operational procedure (A) is effected to obtain a desired ester.

(C) Procedure according to the reaction of the alcohol with the carboxylic anhydride: To a solution of 0.05 mole of the alcohol in 3 times the volume of said alcohol of toluene is added 0.05 mole of the carboxylic anhydride (synthesized from carboxylic acid and acetic anhydride), and the resulting mixture is stirred at 100° C. for 3 hours. Subsequently, by-produced carboxylic acid is recovered by distillation or neutralization with 5% sodium hydroxide. Thereafter, the same after-treatment as in the standard operational procedure (A) is effected to obtain a desired ester.

(D) Procedure according to the reaction of the halide with carboxylic acid: A mixture comprising 0.05 mole of the halide and 0.06 mole of the carboxylic acid is dissolved in 3 times the volume of said mixture of acetone. Into this solution is dropped, while stirring and maintaining the solution at 15° to 20° C., a solution of 0.08 mole of triethylamine in 3 times the volume thereof of acetone. After completion of the dropping, the mixture is refluxed for 2 hours to complete the reaction. After cooling the mixture, deposited triethylamine hydrochloride is separated by filtration, and the acetone is distilled off from the filtrate. The residue is added with 3 times the volume thereof of benzene, and then subjected to the same after-treatment as in the standard operation procedure (A) to obtain a desired ester.

(E) Procedure according to the reaction of the tosylate with the salt of the carboxylic acid: To a solution of 0.05 mole of the tosylate in 3 times the volume of said tosylate of acetone is gradually added with thorough stirring at room temperature 0.06 mole of sodium carboxylate (synthesized by reacting the carboxylic acid with an equimolar amount of sodium hydroxide in water and then removing the water by distillation). Thereafter, the resulting mixture is refluxed for 30 minutes to complete the reaction. After cooling the reaction mixture, a deposited solid substance is separated by filtration, and the acetone is distilled off from the filtrate. The residue is dissolved in 3 times the volume thereof of benzene, and then subjected to the same after-treatment as in the standard operational procedure (A) to obtain a desired ester.

(F) Procedure according to the reaction of alcohol with lower alkyl ester of carboxylic acid: A mixture comprising 0.05 mole of the alcohol and 0.05 mole of ethyl carboxylate is dissolved in 5 times the volume of said mixture of dry toluene. This solution is added with 0.005 mole of sodium ethoxide and then refluxed, and ethanol formed is removed as an azeotrope by use of a rectifier. After the reaction is over, cold water is added to the mixture, and the organic layer is separated and then subjected to the same after-treatment as in the standard operational procedure (A) to obtain a desired ester.

EXAMPLES 1–51

The results obtained by practicing the present process according to the above-mentioned standard operational procedures are set forth in the following table:

| Example number | Alcohol or its derivative | Cyclopropanecarboxylic acid or its derivative | Reaction procedure | Name of compound | Yield, percent | Refractive index ($n_D^{24}$) | Calculated C | Calculated H | Calculated N | Calculated s | Found C | Found H | Found N | Found s |
|---|---|---|---|---|---|---|---|---|---|---|---|---|---|---|
| 1 | 5-benzyl-3-furylmethyl alcohol | 2,2-dimethyl-3-(2'-methoxymethyl-1'-propenyl)-cyclopropanecarboxylic acid chloride | A | 5-benzyl-3-furylmethyl 2',2'-dimethyl-3'-(2''-methoxymethyl-1''-propenyl)-cyclopropanecarboxylate | 89 | 1.5310 | 74.97 | 7.66 | | (for $C_{22}H_{28}O_4$) | 74.94 | 7.72 | | |
| 2 | 5-benzyl-2-thenyl alcohol | 2,2-dimethyl-3-(2'-methoxymethyl-1'-propenyl)-cyclopropanecarboxylic acid chloride | A | 5-benzyl-2-thenyl 2',2'-dimethyl-3'-(2''-methoxymethyl-1''-propenyl)-cyclopropanecarboxylate | 92 | 1.5557 | 71.84 | 7.34 | | 8.34 (for $C_{22}H_{28}O_3S$) | 72.21 | 7.20 | | 8.74 |
| 3 | 3-benzylbenzyl alcohol | 2,2-dimethyl-3-(2'-methoxymethyl-1'-propenyl)-cyclopropanecarboxylic acid anhydride | C | 3-benzylbenzyl 2',2'-dimethyl-3'-(2''-methoxymethyl-1''-propenyl)-cyclopropanecarboxylate | 86 | 1.5496 | 79.33 | 7.99 | | (for $C_{25}H_{30}O_3$) | 79.72 | 7.78 | | |
| 4 | 5-propargylfurfuryl alcohol | 2,2-dimethyl-3-(2'-methoxymethyl-1'-propenyl)-cyclopropanecarboxylic acid chloride | A | 5-propargylfurfuryl 2',2'-dimethyl-3'-(2''-methoxymethyl-1''-propenyl)-cyclopropanecarboxylate | 87 | 1.4994 | 72.13 | 7.65 | | (for $C_{19}H_{24}O_4$) | 72.39 | 7.58 | | |
| 5 | 4,5-tetramethyleneturfuryl alcohol | 2,2-dimethyl-3-(2'-methoxymethyl-1'-propenyl)-cyclopropanecarboxylic acid | B | 4,5-tetramethylenefurfuryl 2',2'-dimethyl-3'-(2''-methoxymethyl-1''-propenyl)-cyclopropanecarboxylate | 87 | 1.5078 | 72.26 | 8.49 | | (for $C_{20}H_{28}O_4$) | 72.31 | 8.44 | | |
| 6 | 5-Phenoxyfurfuryl alcohol | 2,2-dimethyl-3-(2'-methoxymethyl-1'-propenyl)-cyclopropanecarboxylic acid chloride | A | 5-phenoxyfurfuryl 2',2'-dimethyl-3'-(2''-methoxymethyl-1''-propenyl)-cyclopropanecarboxylate | 90 | 1.5193 | 71.33 | 7.07 | | (for $C_{22}H_{26}O_5$) | 71.07 | 7.34 | | |
| 7 | 3-phenoxybenzyl tosylate | Sodium 2,2-dimethyl-3-(2'-methoxymethyl-1'-propenyl)-cyclopropanecarboxylate | E | 3-phenoxybenzyl 2',2'-dimethyl-3'-(2''-methoxymethyl-1''-propenyl)-cyclopropanecarboxylate | 84 | 1.5500 | 75.76 | 7.42 | | (for $C_{24}H_{28}O_4$) | 75.88 | 7.34 | | |
| 8 | N-hydroxymethyl-3,4,5,6-tetrahydrophthalimide | 2,2-dimethyl-3-(2'-methoxymethyl-1'-propenyl)-cyclopropanecarboxylic acid | B | 3,4,5,6-tetrahydrophthalimidomethyl-2',2'-dimethyl-3'-(2''-methoxymethyl-1''-propenyl)-cyclopropanecarboxylate | 88 | 1.5175 | 66.46 | 7.53 | 3.88 | (for $C_{20}H_{27}O_5N$) | 66.59 | 7.81 | 3.98 | |

TABLE—Continued

| Example number | Alcohol or its derivative | Cyclopropanecarboxylic acid or its derivative | Reaction procedure | Name of compound | Yield, percent | Refractive index ($n_D^{24}$) | Elementary analysis, percent Calculated C | H | N | S | Found C | H | N | S |
|---|---|---|---|---|---|---|---|---|---|---|---|---|---|---|
| 9 | N-hydroxymethyl-dimethyl maleimide | 2,2-dimethyl-3-(2'-methoxymethyl-1'-propenyl)-cyclopropanecarboxylic anhydride | C | Dimethylmaleimidomethyl 2,2-dimethyl-3-(2'-methoxymethyl-1'-propenyl)-cyclopropanecarboxylate | 85 | 1.5061 | 64.46 | 7.61 | 4.18 | | 64.34 (for $C_{18}H_{25}O_5N$) | 7.41 | 4.40 | |
| 10 | 5-benzyl-3-furyl-methyl alcohol | 2,2-dimethyl-3-(2'-ethoxymethyl-1'-propenyl)-cyclopropanecarboxylic acid chloride | A | 5-benzyl-3-furylmethyl 2',2'-dimethyl-3'-(2''-ethoxymethyl-1''-propenyl)-cyclopropanecarboxylate | 88 | 1.5315 | 75.36 | 7.91 | | | 75.51 (for $C_{24}H_{30}O_4$) | 8.03 | | |
| 11 | do | 2,2-dimethyl-3-(2'-propargyloxymethyl-1'-propenyl)-cyclopropanecarboxylic acid chloride | A | 5-benzyl-3-furylmethyl 2',2'-dimethyl-3'-(2''-propargyloxymethyl-1''-propenyl)-cyclopropanecarboxylate | 90 | 1.5322 | 76.50 | 7.19 | | | 76.84 (for $C_{25}H_{28}O_4$) | 7.16 | | |
| 12 | do | 2,2-dimethyl-3-(2'-allyloxymethyl-1'-propenyl)-cyclopropanecarboxylic acid chloride | A | 5-benzyl-3-furylmethyl 2,2-dimethyl-3-(2'-allyloxymethyl-1'-propenyl)-cyclopropanecarboxylate | 87 | 1.5317 | 76.11 | 7.67 | | | 76.37 ($O_{25}H_{30}O_4$) | 7.88 | | |
| 13 | do | 2,2-dimethyl-3-(2'-acetyl-1'-propenyl)-cyclopropanecarboxylic acid chloride | A | 5-benzyl-3-furyl 2,2-dimethyl-3-(2'-acetyl-1''-propenyl)-cyclopropanecarboxylate | 92 | 1.5438 | 75.38 | 7.15 | | | 75.21 (for $C_{23}H_{26}O_4$) | 7.47 | | |
| 14 | 5-oxa-4,5,6,7-tetrahydrobenzofurfuryl alcohol | do | A | 5-oxa-4,5,6,7-tetrahydrobenzofurfuryl 2',2'-dimethyl-3'-(2''-acetyl-1''-propenyl)-cyclopropanecarboxylate | 88 | 1.5276 | 68.65 | 7.28 | | | 68.93 (for $C_{19}H_{24}O_5$) | 7.15 | | |
| 15 | 4,5-trimethylene-2-thenyl alcohol | 2,2-dimethyl-3-(2'-acetyl-1'-propenyl)-cyclopropanecarboxylic acid | B | 4,5-trimethylene-2-thenyl 2',2'-dimethyl-3'-(2''-acetyl-1''-propenyl)-cyclopropanecarboxylate | 89 | 1.5466 | 68.74 | 7.28 | | 9.64 | 68.82 (for $C_{19}H_{26}O_3S$) | 7.41 | | 9.34 |
| 16 | 3-phenoxybenzyl chloride | do | D | 3-phenoxybenzyl 2',2'-dimethyl-3'-(2''-acetyl-1''-propenyl)-cyclopropanecarboxylate | 87 | 1.5517 | 76.17 | 6.92 | | | 76.36 (for $C_{24}H_{26}O_4$) | 7.01 | | |
| 17 | N-hydroxymethyl-3,4,5,6-tetrahydrophthalimide | 2,2-dimethyl-3-(2-acetyl-1'-propenyl)-cyclopropanecarboxylic acid chloride | A | 3,4,5,6-Tetrahydrophthalimidomethyl-2',2'-dimethyl-3'-(2''-acetyl-1''-propenyl)-cyclopropanecarboxylate | 92 | 1.5306 | 66.83 | 7.01 | 3.90 | | 66.68 (for $C_{20}H_{25}O_5N$) | 7.22 | 3.71 | |
| 18 | N-hydroxymethyl-dimethyl maleimide | do | A | Dimethylmaleimidomethyl 2',2'-dimethyl-3'-(2''-vinylcarbonyl-1''-propenyl)-cyclopropanecarboxylate | 89 | 1.5187 | 64.85 | 6.95 | 4.20 | | 64.80 (for $C_{18}H_{23}O_5N$) | 7.03 | 4.24 | |
| 19 | 5-benzyl-3-furyl methyl alcohol | 2,2-dimethyl-3-(2'-vinylcarbonyl-1'-propenyl)-cyclopropanecarboxylic acid chloride | A | 5-benzyl-3-furylmethyl 2',2'-dimethyl-3'-(2''-vinylcarbonyl-1''-propenyl)-cyclopropanecarboxylate | 87 | 1.5434 | 76.17 | 6.92 | | | 76.41 (for $C_{24}H_{26}O_4$) | 7.10 | | |
| 20 | do | 2,2-dimethyl-3-(2'-propargylcarbonyl-1'-propenyl)-cyclopropanecarboxylic acid chloride | A | 5-benzyl-3-furylmethyl 2',2',dimethyl-3'-(2''-propargylcarbonyl-1''-propenyl)-cyclopropanecarboxylate | 90 | 1.5465 | 76.90 | 6.71 | | | 76.58 (for $C_{24}H_{24}O_4$) | 6.80 | | |
| 21 | do | 2,2-dimethyl-3-(cyclopentanone-2'-ylidenemethyl)-cyclopropanecarboxylic acid chloride | A | 5-benzyl-3-furylmethyl 2',2'-dimethyl-3-(cyclopentanone-2''-ylidenemethyl)-cyclopropanecarboxylate | 86 | 1.5553 | 76.17 | 6.92 | | | 76.52 (for $C_{24}H_{26}O_4$) | 6.64 | | |
| 22 | Allethrolone | 2,2-dimethyl-3-(2'-methoxymethyl-1'-propenyl)-cyclopropanecarboxylic acid chloride | A | 2-allyl-3-methylcyclopent-2-ene-1-one-4-yl 2',2'-dimethyl-3'-methoxymethyl-1''-propenyl)-cyclopropanecarboxylate | 88 | 1.5040 | 72.26 | 8.49 | | | 72.49 (for $C_{20}H_{28}O_4$) | 8.28 | | |
| 23 | 2-propargyl-3-methylcyclopent-2-ene-1-one-4-ol | do | C | 2-propargyl-3-methylcyclopent-2-ene-1-one-4-yl 2',2'-dimethyl-3'-(2''-methoxymethyl-1''-propenyl)-cyclopropanecarboxylate | 84 | 1.5132 | 72.70 | 7.93 | | | 72.87 (for $C_{20}H_{26}O_4$) | 7.83 | | |
| 24 | Pyrethrolone | do | A | 2-(2',4'-pentadienyl)-3-methylcyclopent-2-ene-1-one-4-yl 2'',2''-dimethyl-3''-(2'''-methoxymethyl-1'''-propenyl)-cyclopropanecarboxylate | 87 | 1.5227 | 73.71 | 8.44 | | | 74.06 (for $C_{22}H_{30}O_4$) | 8.39 | | |
| 25 | Allethrolone | 2,2-dimethyl-3-(2'-ethoxymethyl-1'-propenyl)-cyclopropanecarboxylic acid chloride | A | 2-allyl-3-methylcyclopent-2-ene-1-one-4-yl 2',2'-dimethyl-3'-(2''-ethoxymethyl-1''-propenyl)-cyclopropanecarboxylate | 88 | 1.5051 | 72.80 | 8.73 | | | 72.71 (for $C_{21}H_{30}O_4$) | 8.86 | | |
| 26 | do | 2,2-dimethyl-3-(2'-propargyloxymethyl-1'-propenyl)-cyclopropanecarboxylic acid chloride | A | 2-allyl-3-methylcyclopent-2-ene-1-one-4-yl 2',2'-dimethyl-3'-(2''-propargyloxymethyl-1''-propenyl)-cyclopropanecarboxylate | 91 | 1.5068 | 74.13 | 7.92 | | | 74.54 (for $C_{22}H_{28}O_4$) | 7.55 | | |
| 27 | do | 2,2-dimethyl-3-(2'-alloyloxymethyl-1'-propenyl)-cyclopropanecarboxylic acid chloride | A | 2-allyl-3-methylcyclopent-2-ene-1-one-4-yl 2',2'-dimethyl-3'-(2''-allyloxymethyl-1''-propenyl)-cyclopropanecarboxylate | 86 | 1.5046 | 73.71 | 8.44 | | | 74.03 (for $C_{22}H_{30}O_4$) | 8.47 | | |
| 28 | do | 2,2-dimethyl-3-(2'-acetyl-1'-propenyl)-cyclopropanecarboxylic acid | B | 2-allyl-3-methylcyclopent-2-ene-1-one-4-yl 2',2'-dimethyl-3'-(2''-acetyl-1''-propenyl)-cyclopropanecarboxylate | 83 | 1.5010 | 72.70 | 7.93 | | | 72.94 (for $C_{20}H_{26}O_4$) | 8.19 | | |

3,766,218

TABLE—Continued

Cyclopropanecarboxylic acid ester obtained

| Example number | Alcohol or its derivative | Cyclopropanecarboxylic acid or its derivative | Reaction procedure | Name of compound | Yield, percent | Refractive index ($n_D^{30}$) | Elementary analysis, percent | | | | | | | |
|---|---|---|---|---|---|---|---|---|---|---|---|---|---|---|
| | | | | | | | Calculated | | | | Found | | | |
| | | | | | | | C | H | N | S | C | H | N | S |
| 29 | 2-propargyl-3-methylcyclopent-2-ene-1-ol | 2,2-dimethyl-3-(2'-acetyl-1'-propenyl)-cyclopropanecarboxylic acid chloride | A | 2-propargyl-3-methylcyclopent-2-ene-1-one-4-yl 2',2'-dimethyl-3'-(2''-acetyl-1''-propenyl)-cyclopropanecarboxylate | 89 | 1.5132 | 73.15 (for $C_{20}H_{24}O_4$) | 7.37 | | | 73.42 | 7.26 | | |
| 30 | Cinerolone | ...do... | A | 2-(2'-butenyl)-3-methylcyclopent-2-ene-1-one-4-yl 2',2'-dimethyl-3'-(2''-acetyl-1''-propenyl)-cyclopropanecarboxylate | 88 | 1.5155 | 73.23 (for $C_{21}H_{28}O_4$) | 8.19 | | | 73.55 | 8.38 | | |
| 31 | 2-propargyl-3-methylcyclopent-2-ene-1-ol | 2,2-dimethyl-3-(2'-ethylcarbonyl-1'-propenyl)-cyclopropanecarboxylic anhydride | C | 2-propargyl-3-methylcyclopent-2-ene-1-one-4-yl 2',2'-dimethyl-3'-(2''-ethylcarbonyl-1''-propenyl)-cyclopropanecarboxylate | 83 | 1.5074 | 73.66 (for $C_{21}H_{26}O_4$) | 7.65 | | | 73.72 | 7.67 | | |
| 32 | Allethrolone | 2,2-dimethyl-3-(2'-vinylcarbonyl-1'-propenyl)-cyclopropanecarboxylic acid chloride | A | 2-allyl-3-methylcyclopent-2-ene-1-one-4-yl 2',2'-dimethyl-3'-(2''-vinylcarbonyl-1''-propenyl)-cyclopropanecarboxylate | 87 | 1.5007 | 73.66 (for $C_{21}H_{26}O_4$) | 7.65 | | | 74.08 | 7.56 | | |
| 33 | ...do... | 2,2-dimethyl-3-(2'-propargylcarbonyl-1'-propenyl)-cyclopropanecarboxylic acid | B | 2-allyl-3-methylcyclopent-2-ene-1-one-4-yl 2',2'-dimethyl-3'-(2''-propargylcarbonyl-1''-propenyl)-cyclopropanecarboxylate | 86 | 1.5025 | 74.55 (for $C_{22}H_{26}O_4$) | 7.39 | | | 74.49 | 7.44 | | |
| 34 | ...do... | 2,2-dimethyl-3-(cyclopentanone-2'-ylidenemethyl)-cyclopropanecarboxylic acid chloride | A | 2-allyl-3-methylcyclopent-2-ene-1-one-4-yl 2',2'-(cyclopentanone-2''-ylidenemethyl)-cyclopropanecarboxylate | 92 | 1.5303 | 73.66 (for $C_{21}H_{26}O_4$) | 7.65 | | | 74.10 | 7.82 | | |
| 35 | 3-chloro-4-phenyl-2-butene-1-ol | 2,2-dimethyl-3-(2'-methoxymethyl-1'-propenyl)-cyclopropanecarboxylic acid chloride | A | 3-chloro-4-phenyl-2-butene-1-yl 2',2'-dimethyl-3'-(2''-methoxymethyl-1''-propenyl)-cyclopropanecarboxylate | 87 | 1.5245 | 69.50 (for $C_{21}H_{27}O_3Cl$) | 7.50 | 9.77 Cl | | 69.43 | 7.57 | 9.72 Cl | |
| 36 | 3-chloro-4-(2'-thienyl)-2-butene-1-ol | 2,2-dimethyl-3-(2'-methoxymethyl-1'-propenyl)-cyclopropanecarboxylic anhydride | C | 3-chloro-4-(2'-thienyl)-2-butene-1-yl 2',2'-dimethyl-3'-(2''-methoxymethyl-1''-propenyl)-cyclopropanecarboxylate | 84 | 1.5362 | 61.86 | 6.83 | 9.61 | 8.69 (for $C_{19}H_{25}O_3ClS$) | 61.90 | 6.85 | 9.59 | 8.81 |
| 37 | 3-chloro-4-(2'-furyl)-2-butene-1-ol | 2,2-dimethyl-3-(2'-methoxymethyl-1'-propenyl)-cyclopropanecarboxylic acid chloride | A | 3-chloro-4-(2'-furyl)-2-butene-1-yl 2',2'-dimethyl-3'-(2''-methoxymethyl-1''-propenyl)-cyclopropanecarboxylate | 90 | 1.5072 | 64.67 (for $C_{19}H_{25}O_4Cl$) | 7.14 | 10.05 Cl | | 64.66 | 7.30 | 9.89 Cl | |
| 38 | 3-chloro-4-(p-methylphenyl)-2-butene-1-ol | 2,2-dimethyl-3-(2'-methoxymethyl-1'-propenyl)-cyclopropanecarboxylic anhydride | B | 3-chloro-4-(p-methylphenyl)-2-butene-1-yl 2',2'-dimethyl-3'-(2''-methoxymethyl-1''-propenyl)-cyclopropanecarboxylate | 85 | 1.5215 | 70.10 (for $C_{22}H_{29}O_3Cl$) | 7.76 | 9.41 Cl | | 70.27 | 7.68 | 9.37 Cl | |
| 39 | 1,3-dichloro-4-(o-methylphenyl)-2-butene | 2,2-dimethyl-3-(2'-methoxymethyl-1'-propenyl)-cyclopropanecarboxylic acid | D | 3-chloro-4-(o-methylphenyl)-2-butene-1-yl 2',2'-dimethyl-3'-(2''-methoxymethyl-1''-propenyl)-cyclopropanecarboxylate | 86 | 1.5246 | 70.10 (for $C_{22}H_{29}O_3Cl$) | 7.76 | 9.41 Cl | | 70.20 | 7.81 | 9.32 Cl | |
| 40 | 3-chloro-4-(p-chlorophenyl)-2-butene-1-ol | 2,2-dimethyl-3-(2'-methoxymethyl-1'-propenyl)-cyclopropanecarboxylic acid chloride | A | 3-chloro-4-(p-chlorophenyl)-2-butene-1-yl 2',2'-dimethyl-3'-(2''-methoxymethyl-1''-propenyl)-cyclopropanecarboxylate | 84 | 1.5286 | 63.48 (for $C_{21}H_{26}O_3Cl_2$) | 6.60 | 17.85 Cl | | 63.34 | 6.50 | 18.02 Cl | |
| 41 | 3-chloro-4-(m-chlorophenyl)-2-butene-1-ol | ...do... | A | 3-chloro-4-(m-chlorophenyl)-2-butene-1-yl 2',2'-dimethyl-3'-(2''-methoxymethyl-1''-propenyl)-cyclopropanecarboxylate | 87 | 1.5273 | 63.48 (for $C_{21}H_{26}O_3Cl_2$) | 6.60 | 17.85 Cl | | 63.45 | 6.81 | 17.95 Cl | |
| 42 | 3-chloro-4-(p-methoxyphenyl)-2-butene-1-ol | ...do... | A | 3-chloro-4-(p-methoxyphenyl)-2-butene-1-yl 2',2'-dimethyl-3'-(2''-methoxymethyl-1''-propenyl)-cyclopropanecarboxylate | 85 | 1.5283 | 67.25 (for $C_{22}H_{29}O_4Cl$) | 7.44 | 9.02 Cl | | 67.40 | 7.47 | 8.94 Cl | |
| 43 | 3-chloro-4-(5'-methyl-2'-thienyl)-2-butene-1-yl | 2,2-dimethyl-3-(2'-ethoxymethyl-1'-propenyl)-cyclopropanecarboxylic anhydride | C | 3-chloro-4-(5'-methyl-2'-thienyl)-2-butene-1-yl 2',2'-dimethyl-3'-(2''-methoxymethyl-1''-propenyl)-cyclopropanecarboxylate | 85 | 1.5255 | 62.73 | 7.11 | 9.26 | 8.37 (for $C_{20}H_{27}O_3ClS$) | 62.65 | 7.28 | 9.09 | 9.53 |
| 44 | 3-chloro-4-phenyl-2-butene-1-ol | Sodium 2,2-dimethyl-3-(2'-ethoxymethyl-1'-propenyl)-cyclopropanecarboxylate | E | 3-chloro-4-phenyl-2-butene-1-yl 2',2'-ethoxymethyl-3'-(2''-propenyl)-cyclopropanecarboxylate | 83 | 1.5250 | 70.10 (for $C_{22}H_{29}O_3Cl$) | 7.76 | 9.41 Cl | | 70.03 | 7.73 | 9.46 Cl | |
| 45 | 3-chloro-4-phenyl-2-butene-1-yl tosylate | 2,2-dimethyl-3-(2'-propargyloxymethyl-1'-propenyl)-cyclopropanecarboxylic acid chloride | A | 3-chloro-4-phenyl-2-butene-1-yl 2',2'-dimethyl-3'-(2''-propargyloxymethyl-1''-propenyl)-cyclopropanecarboxylate | 86 | 1.5257 | 71.40 (for $C_{24}H_{27}O_3Cl$) | 7.03 | 9.16 Cl | | 71.25 | 7.12 | 9.08 Cl | |
| 46 | ...do... | 2,2-dimethyl-3-(2'-allyloxymethyl-1'-propenyl)-cyclopropanecarboxylic acid chloride | A | 3-chloro-4-phenyl-2-butene-1-yl 2',2'-dimethyl-3'-(2''-allyloxymethyl-1''-propenyl)-cyclopropanecarboxylate | 86 | 1.5253 | 71.03 (for $C_{24}H_{29}O_3Cl$) | 7.52 | 9.12 Cl | | 71.19 | 7.38 | 9.05 Cl | |
| 47 | ...do... | 2,2-dimethyl-3-(2'-acetyl-1'-propenyl)-cyclopropanecarboxylic acid chloride | A | 3-chloro-4-phenyl-2-butene-1-yl 2',2'-dimethyl-3'-(2''-acetyl-1''-propenyl)-cyclopropanecarboxylate | 89 | 1.5370 | 69.89 ($C_{21}H_{25}O_3Cl$) | 6.98 | 9.82 Cl | | 69.73 | 6.90 | 9.74 Cl | |

Procedures for preparation of the present insecticidal compositions and effects thereof are illustrated with reference to the following examples and test examples:

EXAMPLE 52

0.1 part of each of the present compounds (1), (2), (5), (12), (15), (17), (23) and (25) was dissolved in deodorized kersosene to make the total amount 100 parts, whereby oil sprays of the respective compounds were obtained.

EXAMPLE 53

0.2 part of each of the present compounds (3), (4), (6), (7), (9), (10), (11), (19), (20), (21), (22), (43), (44), (45), (46), (47), (48), (49), (50), (51), (52), (55), (62), (63), (64), (65), (66), (67), (68), (69), (70), (72) and (81) was dissolved in deodorized kerosene to make the total amount 100 parts, whereby oil sprays of the respective compounds were obtained.

EXAMPLE 54

A mixture comprising 0.1 part of each of the present compounds (1), (5), (8), (12), (13), (14), (16), (18), (20), (24), (26), (27), (28), (29), (30), (31), (32), (33), (36) and (39) and 0.3 part of piperonyl butoxide was dissolved in deodorized kerosene to make the total amount 100 parts, whereby oil sprays of the respective compounds were obtained.

EXAMPLE 55

A mixture comprising 0.1 part of each of the present compounds (32), (33), (34), (35), (37), (38), (40), (41), (42), (62), (63), (64), (77) and (78) and 0.2 part of DDVP was dissolved in deodorized kerosene to make the total amount 100 parts, whereby oil sprays of the respective compounds were obtained.

EXAMPLE 56

A mixture comprising 5 parts of each of the present compounds (1), (3), (5), (6), (7), (11), (62), (63), (64), (77), (81) and (84, 15 parts of sufroxane, 10 parts of Sorpol SM-200 (registered trademark of Toho Chemical Co.) and 70 parts of xylene was thoroughly stirred to obtain emulsifiable concentrates of the respective compounds.

EXAMPLE 57

A mixture comprising 0.4 part of the present compound (1), 7 parts of xylene and 7.6 parts of deodorized kerosene was packed in an aerosol container. After attaching a valve portion to the container, 85 parts of a propellant (liquefied petroleum gas) was introduced under pressure through said valve portion into the container to obtain an aerosol.

EXAMPLE 58

A mixture comprising 0.3 part of the present compound (1), 1.5 parts of piperonyl butoxide, 6.2 parts of xylene and 7 parts of deodorized kerosene was treated in the same manner as in Example 57 to obtain an aerosol.

EXAMPLE 59

A mixture comprising 0.3 part of the present compound (5), 0.05 part of Chrysron, 1.5 parts of piperonyl butoxide, 6.15 parts of xylene and 7 parts of deodorized kerosene was treated in the same manner as in Example 57 to obtain an aerosol.

EXAMPLE 60

A mixture comprising 0.2 part of the present compound (11) or the trans isomer of the present compound (63), 0.2 part of phthalthrin, 2 parts of piperonyl butoxide, 6 parts of xylene and 6.6 parts of deodorized kerosene was treated in the same manner as in Example 57 to obtain aerosols of the respective compounds.

EXAMPLE 61

A mixture comprising 0.3 part of the present compounds (12) or (44), 0.5 part of Sumithion (registered trademark of Sumitomo Chemical Co., Ltd.), 7 parts of xylene and 7.2 parts of deodorized kerosene was treated in the same manner as in Example 57 to obtain aerosols of the respective compounds.

EXAMPLE 62

A mixture comprising 0.4 part of the present compound (1) or the trans isomer of the present compound (62), 2 parts of piperonyl butoxide, 11.6 parts of deodorized kerosene and 1 part of an emulsifier Atmos 300 (registered trademark of Atlas Chemical Co.) was emulsified by addition of 50 parts of pure water. Thereafter, the emulsified mixture was packed in an aerosol container together with 35 parts of a 3:1 mixture of deodorized butane and deodorized propane to obtain water-based aerosols of the respective compounds.

EXAMPLE 63

A solution of 0.8 g. of each of the present compounds (1), (5), (15) and the d-cis isomers of the present compounds (62), (68) and (77), in 20 ml. of methanol was uniformly mixed with 99.2 g. of a mosquito coil carrier (a 3:5:1 mixture of Tabu powder, pyrethrum marc and wood flour). After vaporizing the methanol, the mixture was thoroughly kneaded with 150 ml. of water, and then shaped and dried to obtain mosquito coils of the respective compounds.

EXAMPLE 64

A solution of 0.3 g. of the present compounds (1), (48) or (62) and 0.3 g. of allethrin in 20 ml. of methanol was treated in the same manner as in Example 63 to obtain mosquito coils.

EXAMPLE 65

A solution of 0.2 g. of the present compounds (5) or the d-trans isomer of the present compound (62) and 0.1 g. of allethrin in a suitable amount of chloroform was applied to an asbestos piece of 2.5 cm. x 1.5 cm. in area and 0.3 mm. in thickness to obtain a fibrous fumigant insecticidal composition for use on a hot plate.

As the fibrous carrier, there may be used, in addition to the asbestos piece, a pulp sheet or the like material which is equivalent in effectiveness thereto.

EXAMPLE 66

A mixture comprising 5 parts of the present compound (6), (44) or (63), 5 parts of Toyolignin CT (registered trademark of Toyo Spinning Co.) and 90 parts of GSM clay (registered tradename of Zieglite Minning Co.) was thoroughly stirred in a mortar. Subsequently, the mixture was kneaded with 10%, based on the amount of said mixture, of water and granulated by means of a granulator, followed by air-drying, to obtain granules of respective compounds.

EXAMPLE 67

To a solution of 1 part of each of the present compounds (1), (9), (10), (11), (43), (44), (45), (62), (63), (64), (85) and (86) and 3 parts of piperonyl butoxide in 20 parts of acetone was added 96 parts of 300-mesh diatomaceous earth. The resulting mixture was thoroughly stirred in a mortar, and then the acetone was removed by vaporization, whereby dusts of the respective compounds were obtained.

EXAMPLE 68

A mixture comprising 20 parts of the present compound (1), (44) or (62), 5 parts of 1-naphthyl-N-methyl-carbamate and 5 parts of Sorpol SM-200 was thoroughly stirred in a mortar together with 70 parts of 300-mesh talc to obtain wettable powders of the respective compounds.

EXAMPLE 69

A mixture comprising 0.2 part of each of the present compounds (47), (53), (54), (56), (57), (58), (59), (60) and (61) and 1 part of piperonyl butoxide was dissolved in deodorized kerosene to make the total amount 100 parts, whereby oil sprays of the respective compounds were obtained.

EXAMPLE 70

A mixture comprising 10 parts of each of the present compounds (43), (44) and (45), 5 parts of DDVP and 10 parts of Sorpol SM-200 was thoroughly stirred together with 75 parts of xylene to obtain emulsifiable concentrates of the respective compounds.

EXAMPLE 71

A mixture comprising 0.2 part of the present compound (43), 0.2 part of Chrysron, 7 parts of xylene and 7.6 parts of deodorized kerosene was packed in an aerosol container. After attaching a valve portion to the container, 85 parts of a propellant (liquefied petroleum gas) was introduced under pressure through said valve portion into the container to obtain an aerosol.

EXAMPLE 72

A mixture comprising 0.2 part of the present compound (45), 0.2 part of phthalthrin, 2 parts of piperonyl butoxide, 11.6 parts of deodorized kerosene and 1 part of an emulsifier Atmoss 300 was emulsified by addition of 50 parts of pure water. Thereafter, the emulsified mixture was packed in an aerosol container together with 35 parts of a 3:1 mixture of deodorized butane and deodorized propane to obtain a water-based aerosol.

EXAMPLE 73

A solution of 1 g. of each of the present compounds (43), (44), (47), (53), (54), (56), (57), (58), (59), (60) and (61) in 20 ml. of methanol was uniformly mixed with 99 g. of a mosquito coil carrier (a 3:5:1 mixture of Tabu powder, pyrethrum marc and wood flour). After vaporizing the methanol, the mixture was thoroughly kneaded with 150 ml. of water and then shaped and dried to obtain mosquito coils of the respective compounds.

EXAMPLE 74

A solution of 0.2 g. of the present compound (44) and 0.2 g. of allethrin in a suitable amount of chloroform was treated in the same manner as in Example 65 to obtain a fibrous fumigant insecticidal composition for use on a hot plate.

EXAMPLE 75

A solution of 0.2 g. of the present compound (43) and 0.2 g. of 5-propargylfurfuryl chrysanthemate in a suitable amount of chloroform was treated in the same manner as in Example 65 to obtain a fibrous fumigant insecticidal composition for use on a hot plate.

EXAMPLE 76

0.5 part of each of the present compounds (71), (73), (74), (75), (76), (77), (78), (79), (80), (82), (83), (84), (85) and (86) was dissolved in deodorized kerosene to make the total amount 100 parts, whereby oil sprays of the respective compounds were obtained.

EXAMPLE 77

A mixture comprising 0.1 part of each of the present compounds (62), (63), (64), (65), (66), (67), (68), (70), (71), (72), (73), (75), (76), (77), (78), (79), (81), (82), (83) and (85) and 0.5 part of piperonyl butoxide was dissolved in deodorized kerosene to make the total amount 100 parts, whereby oil sprays of the respective compounds were obtained.

EXAMPLE 78

A mixture comprising 0.6 part of the present compound (62), 7 parts of xylene and 7.4 parts of deodorized kerosene was packed in an aerosol container. After attaching a valve portion to the container, 85 parts of a propellant (liquefied petroleum gas) was introduced under pressure through said valve portion into the container to obtain an aerosol.

EXAMPLE 79

A mixture comprising 0.4 part of the present compound (62), 2.0 parts of piperonyl butoxide, 6.2 parts of xylene and 7 parts of deodorized kerosene was treated in the same manner as in Example 87 to obtain an aerosol.

EXAMPLE 80

A mixture comprising 0.3 part of the present compound (64), 2.0 parts of piperonyl butoxide, 6 parts of xylene and 6.6 parts of deodorized kerosene was treated in the same manner as in Example 87 to obtain an aerosol.

EXAMPLE 81

A mixture comprising 0.4 part of the present compound (77), 0.5 part of Sumithion, 7 parts of xylene and 7.1 parts of deodorized kerosene was treated in the same manner as in Example 87 to obtain an aerosol.

Insecticidal effects of the thus obtained compositions of the present invention are as set forth in the following test examples.

TEST EXAMPLE 1

About 50 adults of Northern house mosquitoes were liberated in a (70 cm.$^3$) glass chamber, and 0.7 ml. of each of the oil sprays obtained in Example 52, and the oil sprays containing the present compounds (43), (44), (45), (46), (47), (48), (49), (50), (51), (52), (55), (62), (63), (64), (65), (66), (67), (69), (70), (72) and (81) among the oil sprays obtained in Example 53 was sprayed to the mosquitoes under a pressure of 20 lbs. by use of a glass atomizer. As the result, every oil spray could knock down more than 80% of the mosquitoes within 10 minutes, and could kill more than 70% thereof on the next day.

TEST EXAMPLE 2

According to the Campbell's turn table method (Soap and Sanitary Chemicals, vol. 14, No. 6, p. 119, 1938), 5 ml. of each of the oil sprays obtained in Examples 54, 55, 69, 76, 77 and the oil sprays containing the present compounds (3), (4), (6), (7), (9), (10), (11), (19), (20), (21) and (22) among the oil sprays obtained in Example 53 was sprayed, and a group of about 100 adults of house flies were exposed to the settling mist for 10 minutes. Thereafter, the flies were taken out, fed and allowed to stand, whereby more than 80% of the flies could be killed on the next day.

TEST EXAMPLE 3

Each of the emulsifiable concentrates obtained in Examples 56 and 70 was diluted with water to 20,000 times, and 2 liters of the resulting emulsion was charged in a polystyrol-made case of 23 cm. x 30 cm. in size and 6 cm. in depth. Subsequently, about 100 full-grown larvae of Northern house mosquitoes were liberated in the case, whereby more than 90% of the larvae could be killed on the next day.

TEST EXAMPLE 4

Into a 14 liter-polyethylene bucket containing 10 liters of water was charged 1 g. of the granule obtained in Example 66. After 1 day, about 100 full-grown larvae of Northern house mosquitoes were liberated in the water, and then the alive and dead of the larvae were observed. As the result, more than 90% of the mosquito larvae could be killed within 24 hours.

TEST EXAMPLE 5

Insecticidal effects on house fly adults of the aerosols obtained in Examples 57, 58, 59, 60, 61 and 62 were tested according to the aerosol test method (disclosed in Soap and Chemical Specialities, Blue Book, 1965), using a Peet Grady's chamber (6 ft.$^3$). The results obtained were as shown in the following table:

| Composition | Sprayed amount (g./1,000 ft.$^3$) | Knock down ratio (percent) | | | Mortality (percent) |
|---|---|---|---|---|---|
| | | 5 min. | 10 min. | 15 min. | |
| Aerosol of Example: | | | | | |
| 57 | 3.1 | 42 | 85 | 98 | 95 |
| 58 | 3.0 | 31 | 77 | 94 | 94 |
| 59 | 3.1 | 33 | 79 | 90 | 82 |
| 60 [containing the present compounds (11)] | 3.2 | 30 | 74 | 89 | 80 |
| 60 [containing a d-trans isomer of (63)] | 2.9 | 30 | 74 | 89 | 80 |
| 61 [containing (12)] | 2.9 | 29 | 79 | 92 | 90 |
| 61 [containing (44)] | 2.9 | 29 | 65 | 94 | 85 |
| 71 | 3.0 | 23 | 57 | 92 | 71 |
| 78 | 3.2 | 26 | 54 | 80 | 68 |
| 79 | 3.1 | 31 | 67 | 88 | 79 |
| 80 | 3.0 | 33 | 74 | 90 | 84 |
| 81 | 2.9 | 25 | 56 | 81 | 78 |
| Water-based aerosol of Example: | | | | | |
| 62 [containing (1)] | 3.4 | 34 | 82 | 98 | 98 |
| 62 [containing a d-trans isomer of (62)] | 3.2 | 34 | 62 | 91 | 81 |
| 72 | 3.3 | 30 | 68 | 92 | 70 |

TEST EXAMPLE 6

About 50 adults of Northern house mosquitoes were liberated in a (70 cm.$^3$) glass chamber, and a battery-driven small motor fan (13 cm. in blade diameter) was placed in the chamber and rotated. Subsequently, 0.5 g. of each of the mosquito coils obtained in Examples 63, 64 and 73 was ignited on both ends and put in the chamber. As the result, every mosquito coil could knock down more than 80% of the mosquitoes within 20 minutes.

TEST EXAMPLE 7

About 50 adults of house flies were liberated in a (70 cm.$^3$) glass chamber, and a battery-driven small motor fan (13 cm. in blade diameter) was placed in the chamber and rotated. Subsequently, the heating fumigant composition obtained in Examples 65, 74 or 75 was placed on an electrically heated plate and fumigated in the chamber. As the result more than 80% of the flies could be knocked down within 20 minutes.

TEST EXAMPLE 8

Onto the bottom of a glass Petri dish of 14 cm. in diameter was dusted 2 g./m.$^2$ of each of the dusts obtained in Example 67, and the dish was coated on the inner wall with butter, leaving at the lower part an uncoated portion of about 1 cm. in width. Subsequently, a group of about 10 German cockroach adults were liberated in the dish and contacted with the dust for 30 minutes. As the result, every dust could knock down more than 80% of the cockroaches, and more than 70% of the knocked-down cockroaches could be killed on the third day after the contact.

TEST EXAMPLE 9

100 grams of unhulled rice grains were thoroughly mixed with 100 mg. of each of the dusts obtained in Example 67, and the resulting mixture was charged into a 100 ml. glass Erlenmeyer flask. Into the flask were liberated about 50 rice weevils, and then the flask was covered. As the result, more than 80% of the weevils could be killed within one week.

TEST EXAMPLE 10

Rice plants, which had elapsed 45 days after showing, were group in 1/50,000 Wagner pots. On the other hand, the emulsifiable concentrates containing the present compounds (1), (3) and (11), among the emulsifiable concentrates obtained in Example 56, and the wettable powder containing the present compound (1) among the wettable powder obtained in Example 68 were individually diluted with water to 200 times. Each of the resulting dilutions was sprayed to the rice plants in a proportion of 10 ml./pot. Subsequently, each pot was covered with a wire net, and about 30 adults of green rice leafhoppers were liberated in the net. As the result, more than 80% of the leafhoppers could be killed on the next day.

TEST EXAMPLE 11

Rice plants, which had elapsed 45 days after sowing, were grown in 1/50,000 Wagner pots. On the other hand, the emulsifiable concentrates obtained in Example 70 and the wettable powder containing the present compound (44) among the wettable powders obtained in Example 68 were individually diluted with water to 100 times. Each of the resulting dilutions was sprayed to the rice plants in a proportion of 10 ml./pot. Subsequently, each pot was covered with a wire net, and about 30 adults of green rice leafhoppers were liberated in the net, As the result, more than 80% of the leafhoppers could be killed on the next day.

TEST EXAMPLE 12

To about 20 rice seedlings, which had elapsed 20 days after sowing and which were being grown in flower pots of 9 cm. in diameter, each of the dusts containing the present compounds (43), (44) and (45) among the dusts obtained in Example 67 was dusted for 4 minutes in a proportion of 300 mg./pot by use of a bell jar duster. Each pot was covered with a wire net, and about 20 adults of brown planthoppers were liberated in the net. As the result, every dust could kill more than 90% of the planthoppers within 24 hours.

TEST EXAMPLE 13

Rice plants, which had elapsed 45 days after sowing, were grown in 1/50,000 Wagner pots. On the other hand, the emulsifiable concentrates containing the present compounds (62), (63) and (64), among the emulsifiable concentrates obtained in Example 56, and the wettable powder containing the present compound (44) among the wettable powders obtained in Example 68, were individually diluted with water to 200 times. Each of the resulting dilutions was sprayed to the rice plants in a proportion of 10 ml./pot. Subsequently, each pot was covered with a wire net, and about 30 adults of green rice leafhoppers were liberated in the net. As the result, more than 80% of the leafhoppers could be killed on the next day.

TEST EXAMPLE 14

Into a glass Petri dish of 14 cm. in diameter were liberated 10 tobacco cutworm larvae of 3-4 instar stage. On the other hand, the emulsifiable concentrates containing the present compounds (62) and (63), among the emulsifiable concentrates obtained in Example 56, were diluted with water to 150 times. Subsequently, 1 ml. of each of the resulting dilutions was sprayed to the larvae.

Thereafter, the larvae were allowed to stand in a Petri dish, in which baits had previously been charged. As the result, 100% of the larvae could be killed after 2 days.

TEST EXAMPLE 15

Each of the emulsifiable concentrates containing the present compounds (62), (63), (64), (77), (81) and (84) among the emulsifiable concentrates obtained in Example 56 was diluted with water to 200 times, and sprayed to cabbage seedlings which had elapsed 20 days after germination. After air-drying, the seedlings were placed in a Petri dish together with aphides (*Muzus persica*), and the alive and dead of the aphides after 2 days were observed. As the result, more than 80% of the aphides could be killed.

What is claimed is:

1. A compound of the formula,

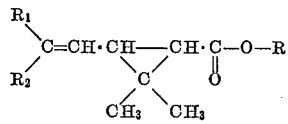

wherein $R_1$ is methyl, $R_2$ is a $C_1$–$C_5$ alkoxymethyl, a $C_3$–$C_5$ alkenoxymethyl, a $C_3$–$C_5$ alkynoxymethyl, a $C_1$–$C_5$ alkylcarbonyl, a $C_2$–$C_5$ alkenylcarbonyl or a $C_2$–$C_5$ alkynylcarbonyl, or $R_1$ and $R_2$ are bonded at respective ends to form cyclic ketone, R is a member of

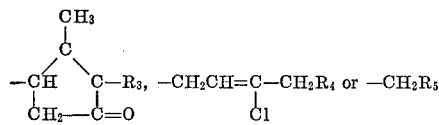

wherein $R_3$ is a $C_3$–$C_5$ alkenyl, a $C_3$–$C_5$ alkynyl or $C_5$ alkadienyl, $R_4$ is a substituted or unsubstituted phenyl, thienyl or furyl (the substituent being methyl, methoxy or a halogen), and $R_5$ is a substituted phenyl, thienyl or furyl (the substituent being a $C_1$–$C_3$ alkyl, a $C_3$–$C_5$ alkenyl, $C_5$ alkadienyl, a $C_3$–$C_5$ alkynyl, a halogen, benzyl, thenyl, furylmethyl, phenoxy, phenylthio or a polymethylene containing or not containing oxygen in the carbon chain having 3-4 carbon atoms), or phthalimido, thiophthalimido, di- or tetrahydrophthalimido or a substituted maleimido (the substituent being one or two $C_1$–$C_4$ alkyls or phenyls).

2. A compound according to claim 1, wherein R is

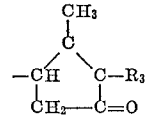

wherein $R_3$ is as defined in claim 1.

3. A compound according to claim 1, wherein R is

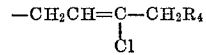

wherein $R_4$ is as defined in claim 1.

4. A compound according to claim 1, wherein R is —$CH_2R_5$ wherein $R_5$ is as defined in claim 1.

5. A compound according to claim 4, wherein $R_5$ is the substituted furyl defined in claim 1.

6. A compound of the formula

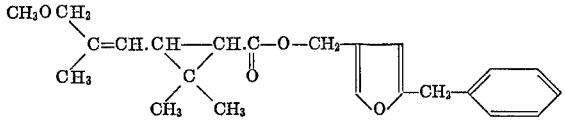

(References on following page)

References Cited

UNITED STATES PATENTS

| | | | |
|---|---|---|---|
| 3,268,396 | 8/1966 | Kuramoto et al. | 260—326 NS X |
| 3,268,398 | 8/1966 | Kato et al. | 260—326 NS X |
| 3,268,400 | 8/1966 | Kato et al. | 260—326 NS X |
| 3,519,649 | 7/1970 | Ueda et al. | 260—332.2 |

OTHER REFERENCES

Harper et al.; J. Sci. Food, Agric., 2, pp. 414–420 (1951).

Cantu et al.: J. Econ. Entomol., vol. 63, pp. 1373–4 (1970).

Chemical Abstracts, vol. 54, col. 13025 (1960) (abstract of Japanese Pat. 2,426 (59)).

Chemical Abstracts, vol. 67, p. 1038s (subject index) (1967).

JOHN D. RANDOLPH, Primary Examiner

U.S. Cl. X.R.

260—240 R, 325, 326 NS, 326.1, 332.2 R, 345.8, 468 P, 514 P, 544 R; 424—274, 275, 285, 306